United States Patent
Ikemizo

(10) Patent No.: US 7,099,573 B2
(45) Date of Patent: Aug. 29, 2006

(54) ZOOM LENS CAMERA, AND A ROTATION TRANSFER MECHANISM

(75) Inventor: Takahiro Ikemizo, Saitama (JP)

(73) Assignee: PENTAX Corporation, Tokyo (JP)

( * ) Notice: Subject to any disclaimer, the term of this patent is extended or adjusted under 35 U.S.C. 154(b) by 50 days.

(21) Appl. No.: 10/803,903

(22) Filed: Mar. 19, 2004

(65) Prior Publication Data

US 2004/0202460 A1   Oct. 14, 2004

(30) Foreign Application Priority Data

Mar. 20, 2003   (JP)   .............................. 2003-078161

(51) Int. Cl.
*G03B 13/10* (2006.01)
*G03B 15/03* (2006.01)
*F16D 21/04* (2006.01)

(52) U.S. Cl. .......................... 396/62; 396/84; 396/379; 192/20

(58) Field of Classification Search .................. 396/62, 396/84, 175, 379; 192/20; 74/405, 431, 74/1.5
See application file for complete search history.

(56) References Cited

U.S. PATENT DOCUMENTS

| 5,592,250 | A | * | 1/1997 | Shimizu | 396/79 |
| 5,848,302 | A | * | 12/1998 | Machida | 396/60 |
| 6,374,051 | B1 | * | 4/2002 | Yamane | 396/177 |
| 6,624,955 | B1 | | 9/2003 | Nomora et al. | 359/701 |

* cited by examiner

*Primary Examiner*—W. B. Perkey
(74) *Attorney, Agent, or Firm*—Greenblum & Bernstein, P.L.C.

(57) ABSTRACT

A zoom lens camera includes an optical-element drive mechanism for a photographing optical system, and a zooming-associating mechanism for associating a zooming-associated driven member with a zooming operation to be driven by the optical-element drive mechanism in a ready-to-photograph state, and for releasing the association of the zooming-associated driven member with the zooming operation between the ready-to-photograph state and the retracted state. The zooming-associating mechanism includes three rotational members, and includes a master rotational member and a slave rotational member at opposite ends thereof. Opposed surfaces of two adjacent rotational members include rotation transfer portions engaged with each other at predetermined relative angular positions so as to integrally rotate.

16 Claims, 12 Drawing Sheets

Fig. 2
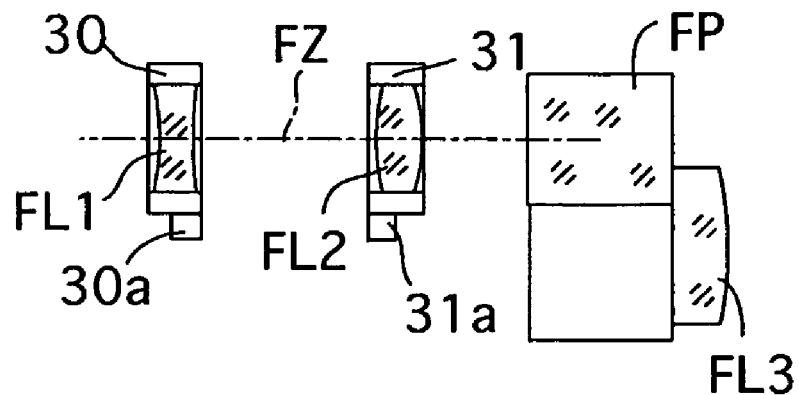
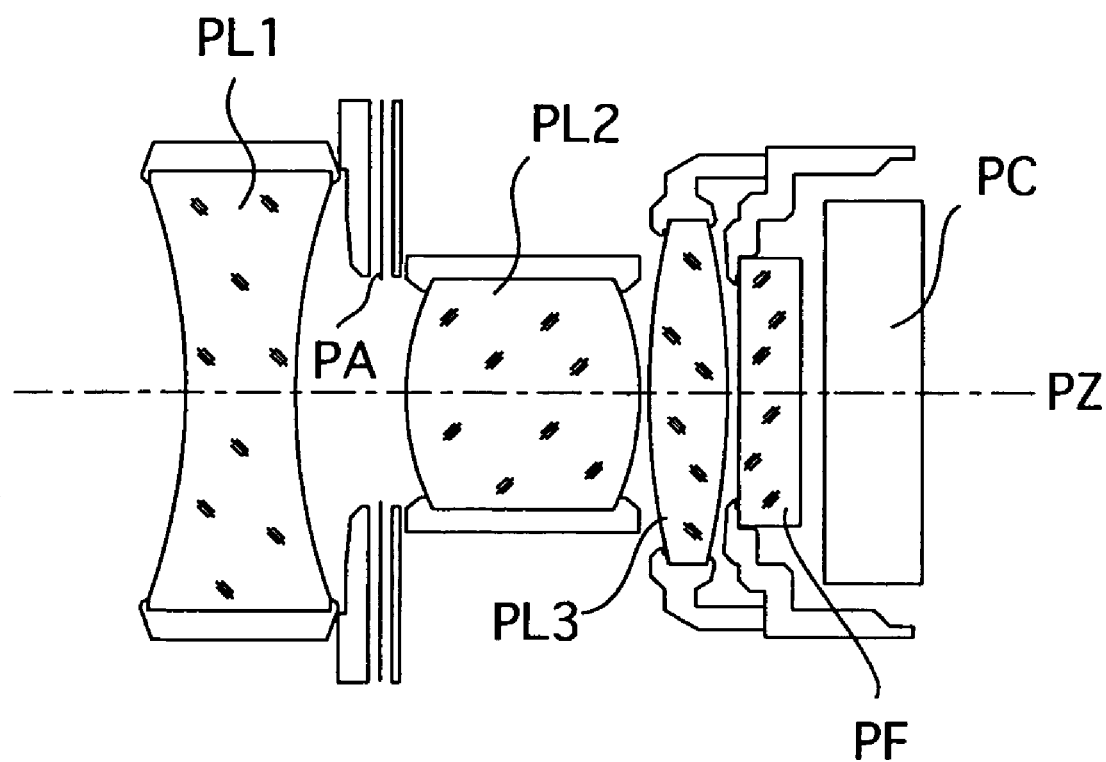

ZOOM LENS CAMERA, AND A ROTATION TRANSFER MECHANISM

BACKGROUND OF THE INVENTION

1. Field of the Invention

The present invention relates to a zoom lens camera including a driven member which is driven in association with a zooming operation of a photographing optical system. The present invention also relates to a rotation transfer mechanism for transmitting rotation of a rotational ring to an associated member to move the associated member in association with the rotation of the rotational ring.

2. Description of the Related Art

A zoom lens camera (i.e., a camera with a zoom lens) with a zoom viewfinder and/or a zoom flash which is driven in association with a zooming operation of a photographing optical system of the zoom lens, wherein a driving force for driving the zoom viewfinder and/or the zoom flash is obtained from movement of a rotational ring for driving the photographing optical system, is known in the art. In this type of zoom lens camera which is capable of not only moving the photographing optical system in a predetermined zooming range (between wide and telephoto) but also retracting the photographing optical system to a retracted position (accommodation position), the rotational ring and the zoom viewfinder and/or the zoom flash need not to be associated with each other when the photographing optical system is moved in an advancing/retracting range (non-photographing range) between the zooming range and the retracted position (e.g., between wide-angle extremity and the retracted position). Providing an associating mechanism (linkage) for associating the zoom viewfinder and/or the zoom flash with the zooming operation with such an association releasing function tends to increase the size of the associating mechanism. It is difficult to provide the associating mechanism with the association releasing function while keeping the associating mechanism small and compact in size, especially when the range of rotation of the aforementioned rotational ring for driving the photographing optical system in the advancing/retracting range between the zooming range and the retracted position is large. The same problem arises not only in the rotation transfer mechanism of the aforementioned type of zoom lens camera but also in a general rotation transfer mechanism which needs to be capable of releasing the association of a rotational ring with an associated member which moves in association with rotation of the rotational ring.

SUMMARY OF THE INVENTION

The present invention provides a zoom lens camera including an associating mechanism for associating a zooming-associated driven member with a zooming operation of the photographing optical system to drive the zooming-associated driven member in association with the zooming operation, wherein the associating mechanism selectively switches between an association state in which the zooming-associated driven member is driven in association with the zooming operation and an association released state in which the zooming-associated driven member is not driven in association with the zooming operation, and wherein the associating mechanism can be constructed as a small and compact mechanism.

The present invention provides a rotation transfer mechanism for transmitting rotation of a rotational ring to an associated member to move the associated member in association with the rotation of the rotational ring, wherein the rotation transfer mechanism can selectively switch between an association state in which the associated member is driven in association with rotation of the rotational ring and an association released state in which the associated member is not driven in association with rotation of the rotational, and wherein the rotation transfer mechanism can be constructed as a small and compact mechanism.

According to an aspect of the present invention, a zoom lens camera is provided, including an optical-element drive mechanism for driving optical elements of a photographing optical system along an optical axis thereof to perform a zooming operation in a ready-to-photograph state, and a retracting operation in which the photographing optical system is retracted to change from the ready-to-photograph state to a retracted state; and a zooming-associating mechanism for associating at least one zooming-associated driven member with the zooming operation so that the zooming-associated driven member is driven by the optical-element drive mechanism in association with the zooming operation in the ready-to-photograph state, and for releasing the association of the zooming-associated driven member with the zooming operation during a transitional state between the ready-to-photograph state and the retracted state. The zooming-associating mechanism includes at least three rotational members which are coaxially positioned on a common rotational axis to be rotatable thereon relative to one another. The three rotational members include a master rotational member and a slave rotational member which are positioned at opposite ends of the common rotational axis, respectively, the master rotational member being associated with the optical-element drive mechanism to rotate, the slave rotational member driving the zooming-associated driven member by a rotation thereof. Each opposed surfaces of any two adjacent rotational members of the three rotational members include a rotation transfer portion, the rotation transfer portions being engaged with each other at predetermined relative angular positions thereof so that the any two adjacent rotational members integrally rotate, the any two adjacent rotational members being allowed to rotate relative to each other at relative angular positions thereof other than the predetermined relative angular positions. The slave rotational member rotates together with the master rotational member after relative rotations among the any two adjacent rotational members occur in sequence when the photographing optical system changes from the retracted state to the ready-to-photograph state.

The zoom lens camera can further include a biasing member for holding the slave rotational member at an angular position thereof at which the slave rotational member is held before being rotated together with the master rotational member.

It is desirable for the master rotational member and the slave rotational member to be identical to each other in shape and size, and symmetrically positioned with respect to a plane orthogonal to the common rotational axis.

It is desirable for each of the two rotation transfer portions to include a projection which projects from the opposed surface thereof, so that each of the two rotation transfer portions has opposite end surfaces in the rotational direction. One of the opposite end surfaces of one of the any two adjacent rotational members and one of the opposite end surfaces of the other of the any two adjacent rotational members are in contact with each other when the photographing optical system is in the retracted state. The other of the opposite end surfaces of the one of the any two adjacent rotational members and the other of the opposite end surfaces of the other of the any two adjacent rotational members come into contact with each other after the any two adjacent rotational members rotate relative to each other when the photographing optical system changes from the retracted state to the ready-to-photograph state.

It is desirable for a peripheral surface of each of at least the master rotational member and the slave rotational member among the three rotational members to include a gear portion.

The zooming-associating mechanism can include at least one gear positioned between the master rotational member and the optical-element drive mechanism, and another at least one gear positioned between the slave rotational member and the zooming-associated driven member.

The biasing member can be a torsion coil spring positioned around an axis of a gear of the another at least one gear.

The zoom lens camera can include a viewfinder optical system independent of the photographing optical system, the zooming-associated driven member including at least one movable optical element of the viewfinder optical system, the movable optical element being driven by the optical-element drive mechanism to vary a viewing angle of the viewfinder optical system in association with the zooming operation.

The zoom lens camera can include a zoom flash provided independently from the photographing optical system. The zooming-associated driven member includes at least one movable optical element of the zoom flash, the movable optical element being driven by the optical-element drive mechanism to vary an angle of illumination of the zoom flash in association with the zooming operation.

It is desirable for the optical-element drive mechanism to include a zoom gear which is rotatable about a rotational axis parallel to the common rotational axis of the three rotational members; and a cam ring which is rotatable about a rotational axis parallel to the common rotational axis of the three rotational members. It is desirable for the cam ring to include cam surfaces for moving the optical elements of the photographing optical system among the optical axis thereof in predetermined moving manners; and a circumferential gear formed on a peripheral surface of the cam ring to be engaged with the zoom gear. The master rotational member rotates in synchronization with the zoom gear.

It is desirable for the zoom lens camera to include a retractable zoom lens barrel which is positioned around the photographing optical system, and retracted into a camera body upon a main switch of the zoom lens camera being turned OFF.

It is desirable for the zoom lens camera to include a zoom motor and a reduction gear train for transferring a driving force of the zoom motor to the zoom gear.

It is desirable for the zooming-associating mechanism to include a cam plate positioned between the another at least one gear and the zooming-associated driven member to be linearly guided in a direction orthogonal to a direction parallel to the optical axis.

In another embodiment, a rotation transfer mechanism is provided, including a rotational ring which is rotatable forwardly and reversely, and an associated driven member which is driven in association with a rotation of the rotational ring, and at least three rotational members which are coaxially positioned on a common rotational axis to be rotatable thereon relative to one another, the common rotational axis extending parallel to a rotational axis of the rotational ring. The three rotational members can include a master rotational member and a slave rotational member which are positioned at opposite ends of the three rotational members in a direction of the common rotational axis, respectively, the master rotational member being continuously associated with the rotation transfer mechanism to rotate whenever the rotation transfer mechanism operates, the slave rotational member driving the associated driven member by a rotation of the slave rotational member. Opposed surfaces of any two adjacent rotational members of the three rotational members, which are adjacent to each other in the direction of the common rotational axis, each include a rotation transfer portion, the rotation transfer portions being engaged with each other at predetermined relative angular positions thereof in a rotational direction of the three rotational members so that the any two adjacent rotational members integrally rotate, the any two adjacent rotational members being allowed to rotate relative to each other at relative angular positions thereof other than the predetermined relative angular positions. The slave rotational member rotates together with the master rotational member after relative rotations among all the any two adjacent rotational members occur in sequence when the photographing optical system changes from the retracted state to the ready-to-photograph state.

The rotation transfer mechanism can include a biasing member for holding the slave rotational member at an angular position thereof at which the slave rotational member is held before being rotated together with the master rotational member.

It is desirable for the master rotational member and the slave rotational member to be identical to each other in shape and size, and symmetrically positioned with respect to a plane orthogonal to the common rotational axis.

In another embodiment, a zoom lens camera is provided, having a retractable zoom lens which is retracted into a camera body upon a main switch of the zoom lens camera being turned OFF, wherein the zoom lens camera includes a zoom lens drive mechanism for driving the retractable zoom lens along an optical axis to perform a zooming operation in a ready-to-photograph state of the retractable zoom lens, and for retracting the retractable zoom lens into the camera body to change the retractable zoom lens from the ready-to-photograph state to a retracted state upon the main switch being turned OFF; and a interconnection mechanism which interconnects the zoom lens drive mechanism with at least one zooming-associated driven member so that the zooming-associated driven member is driven by the zoom lens drive mechanism in association with the zooming operation in the ready-to-photograph state, the interconnection mechanism releasing an interconnection between the zoom lens drive mechanism and the zooming-associated driven member while the retractable zoom lens changes between the ready-to-photograph state and the retracted state. The interconnection mechanism includes at least three rotational members which are coaxially positioned on a common rotational axis are rotatable thereon relative to one another. The three rotational members include a master rotational member and a slave rotational member which are positioned at opposite ends of the three rotational members in a direction of the common rotational axis, respectively, the master rotational member being continuously associated with the zoom lens drive mechanism to rotate whenever the zoom lens drive mechanism operates, the slave rotational member driving the zooming-associated driven member by a rotation of the slave rotational member. Opposed surface of any two adjacent rotational members of the three rotational members which are adjacent to each other in the direction of the common rotational axis each include a rotation transfer projection, the rotation transfer portions being engaged with each other at predetermined relative angular positions thereof in a rotational direction of the three rotational members so that the any two adjacent rotational members rotate as one body, the any two adjacent rotational members being allowed to rotate relative to each other at relative angular positions thereof other than the predetermined relative angular positions. The slave rotational member rotates together with the master rotational member after relative rotations among all the any two adjacent rotational members occur in sequence when the retractable zoom lens changes from the retracted state to the ready-to-photograph state.

The present disclosure relates to subject matter contained in Japanese Patent Application No. 2003-078161 (filed on Mar. 20, 2003) which is expressly incorporated herein by reference in its entirety.

BRIEF DESCRIPTION OF THE DRAWINGS

The present invention will be described below in detail with reference to the accompanying drawings in which:

FIG. 2 is a cross sectional view of a photographing lens system and a viewfinder optical system of the zoom lens camera shown in FIG. 1 in the retracted state of the zoom lens;

DESCRIPTION OF THE PREFERRED EMBODIMENT

Figure 1:
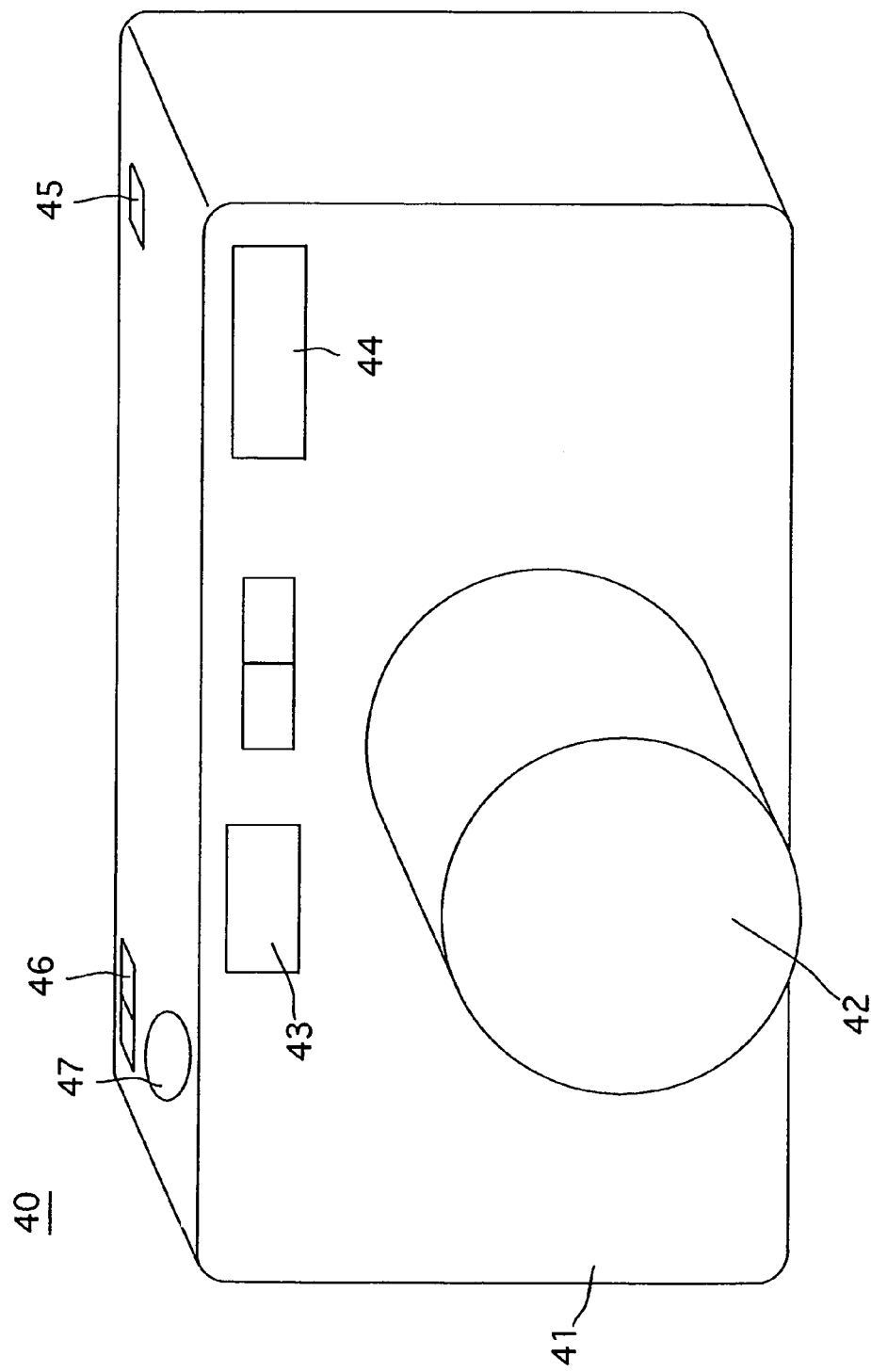
FIG. 1 is a perspective view of an embodiment of a zoom lens camera according to the present invention.

FIG. 1 shows an embodiment of a zoom lens camera according to the present invention. The zoom lens camera 40 is provided, at an approximate center of the front of the zoom lens camera, with a zoom lens barrel 42 including a photographing optical system. The zoom lens barrel 42 is of a retractable type which is retracted into a camera body 41 of the zoom lens camera 40 upon a main switch 45 of the zoom lens camera 40 being turned OFF. The zoom lens camera 40 is provided with a viewfinder and a built-in flash, and the zoom lens camera 40 is provided on front of the camera body 41 with a viewfinder objective window 43 of the viewfinder and a flash lens (Fresnel lens) 44 of the built-in flash. The viewfinder of the zoom lens camera 40 is a zoom viewfinder which varies its angle of view in association with a zooming operation of the photographing optical system (i.e., in association with a variation in focal length of the photographing optical system), and the built-in flash of the zoom lens camera 41 is a zoom flash which varies its angle of illumination (flash coverage) in association with a zooming operation of the photographing optical system. The zoom lens camera 40 is provided on a top surface of the camera body 41 with the main switch 45, a zoom switch 46 and a release button 47.

Figure 3:
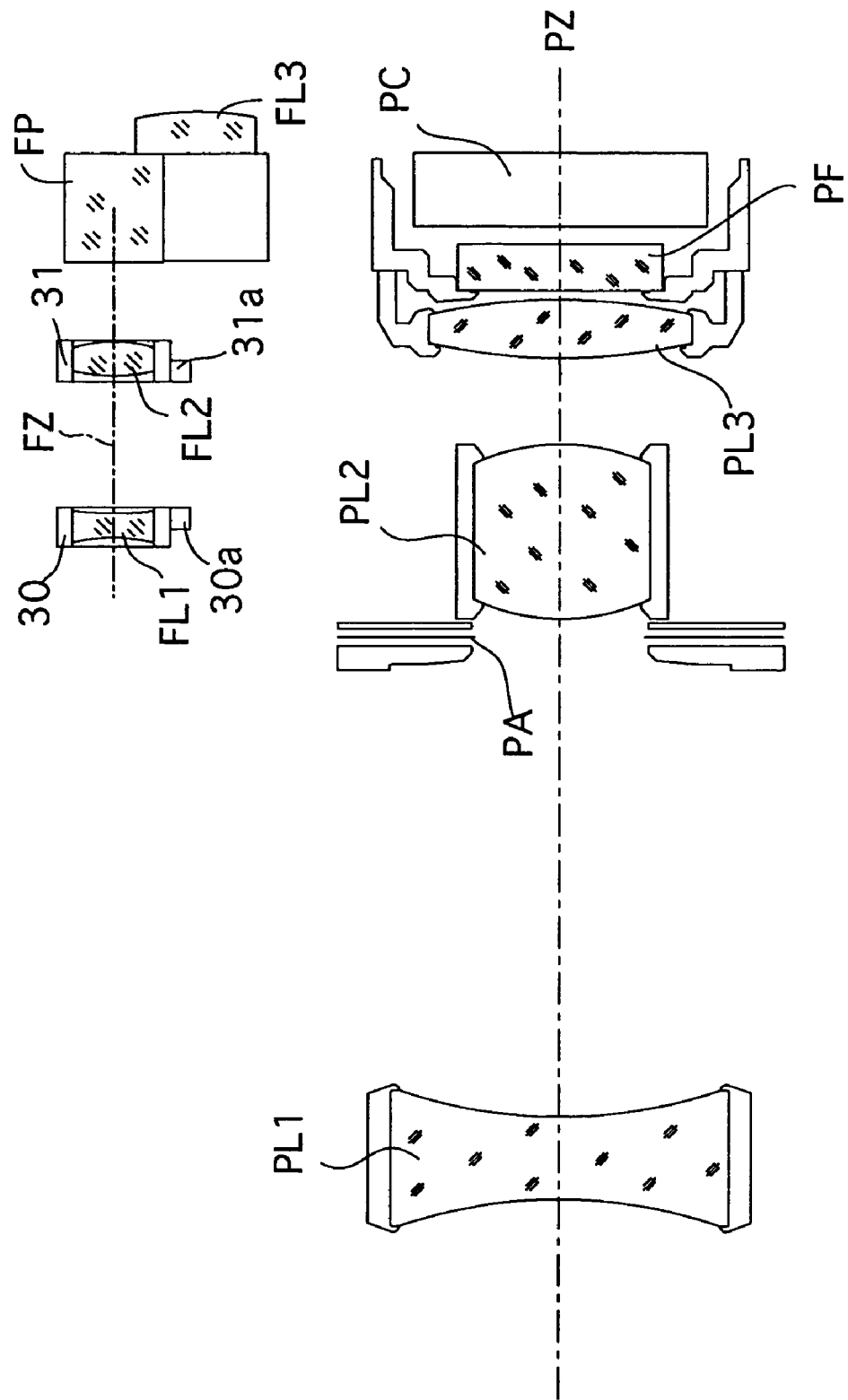
FIG. 3 is a view similar to that of FIG. 2, showing the photographing lens system and the viewfinder optical system at wide-angle extremity of the zoom lens.
Figure 4:
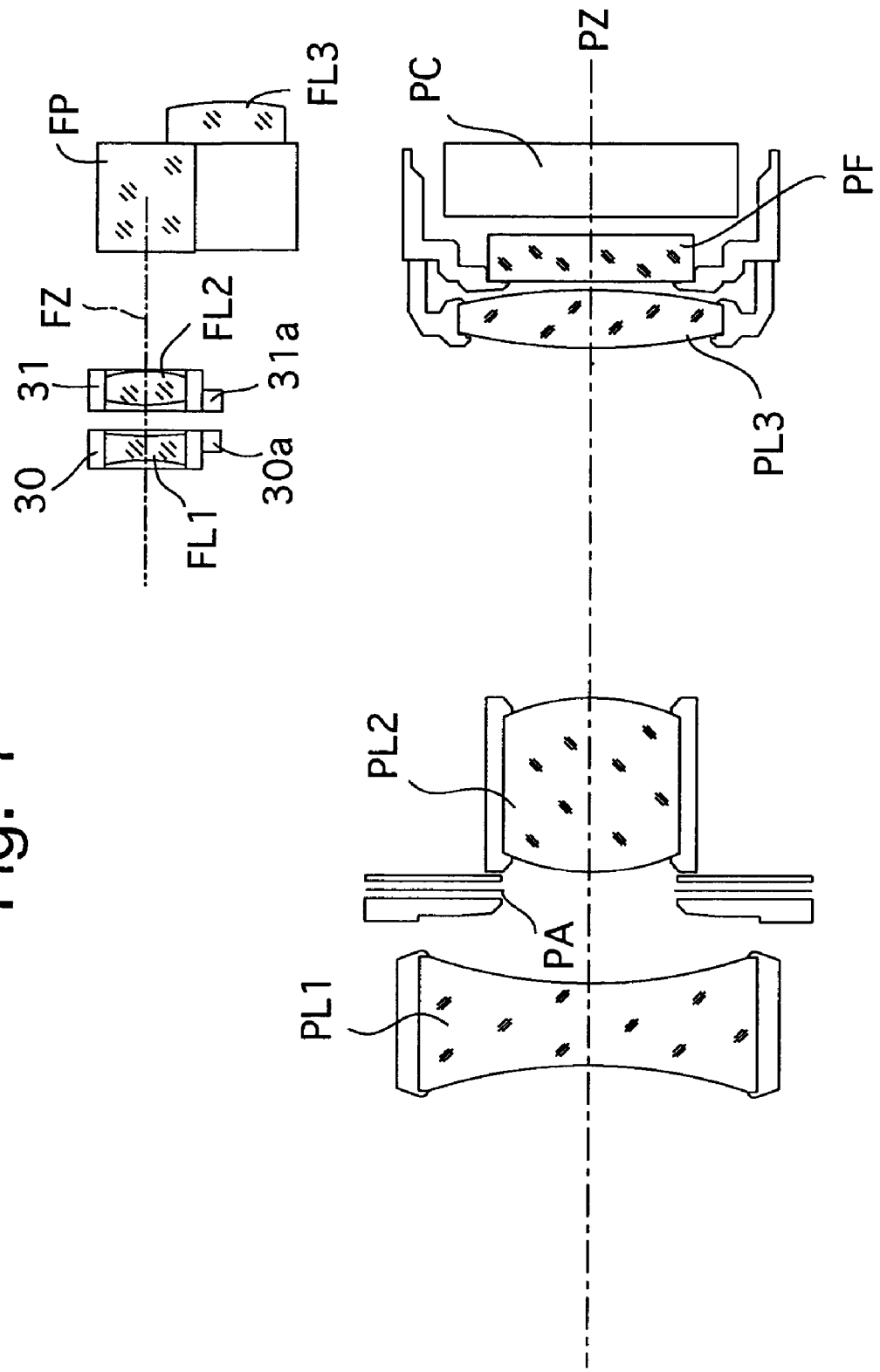
FIG. 4 is a view similar to that of FIG. 2, showing the photographing lens system and the viewfinder optical system at telephoto extremity of the zoom lens.

FIGS. 2 through 4 show the photographing optical system and the viewfinder optical system of the zoom lens camera 40. The photographing optical system includes a first lens group PL1, a shutter (diaphragm shutter) PA; a second lens group PL2, a third lens group PL3, an optical low-pass filter (and other filter or filters) PF and a solid-state image pick-up device (e.g., CCD image sensor) PC, in that order from the object side. "PZ" shown in FIG. 2 represents the optical axis of the photographing optical systems. The first lens group PL1 and the second lens group PL2 are driven along the optical axis PZ in a predetermined moving manner to perform a zooming operation, while the third lens group PL3 is driven along the optical axis PZ to perform a focusing operation. FIGS. 3 and 4 show a ready-to-photograph state at wide-angle extremity and telephoto extremity of the photographing optical system, respectively. FIG. 2 shows a retracted state (accommodation state) of the photographing optical system. The photographing optical system is in the retracted state shown in FIG. 2 when the main switch 45 is OFF. Upon the main switch being turned ON, the zoom lens barrel 42 is advanced from the camera body 41 to move the photographing optical system to wide-angle extremity as shown in FIG. 3. Thereafter, the focal length of the photographing optical system can be freely varied between the wide-angle extremity (FIG. 3) and the telephoto extremity (FIG. 4) by manually operating the zoom switch 46. Upon the main switch 45 being turned OFF, the zoom lens barrel 42 is retracted into the camera body 41 so that the photographing optical system enters the retracted state as shown in FIG. 2 regardless of the focal length set immediately before the main switch 45 is turned OFF.

The viewfinder optical system that is shown in FIGS. 2 through 4 is positioned in the camera body 41 behind the viewfinder objective window 43. The viewfinder optical system consists of a first lens group (zooming-associated driven member/movable optical element) FL1, a second lens group (zooming-associated driven member/movable optical element) FL2, a prism FP, and an eyepiece FL3, in that order from the object side. The viewfinder optical system serves as a zoom viewfinder which varies the focal length in association with a zooming operation of the photographing optical system. The first lens group FL1 and the second lens group FL2 are driven along a viewfinder optical axis FZ, which is parallel to the photographing optical axis PZ, in a predetermined moving manner to vary an angle of view (magnification) of the viewfinder optical system.

Figure 5:
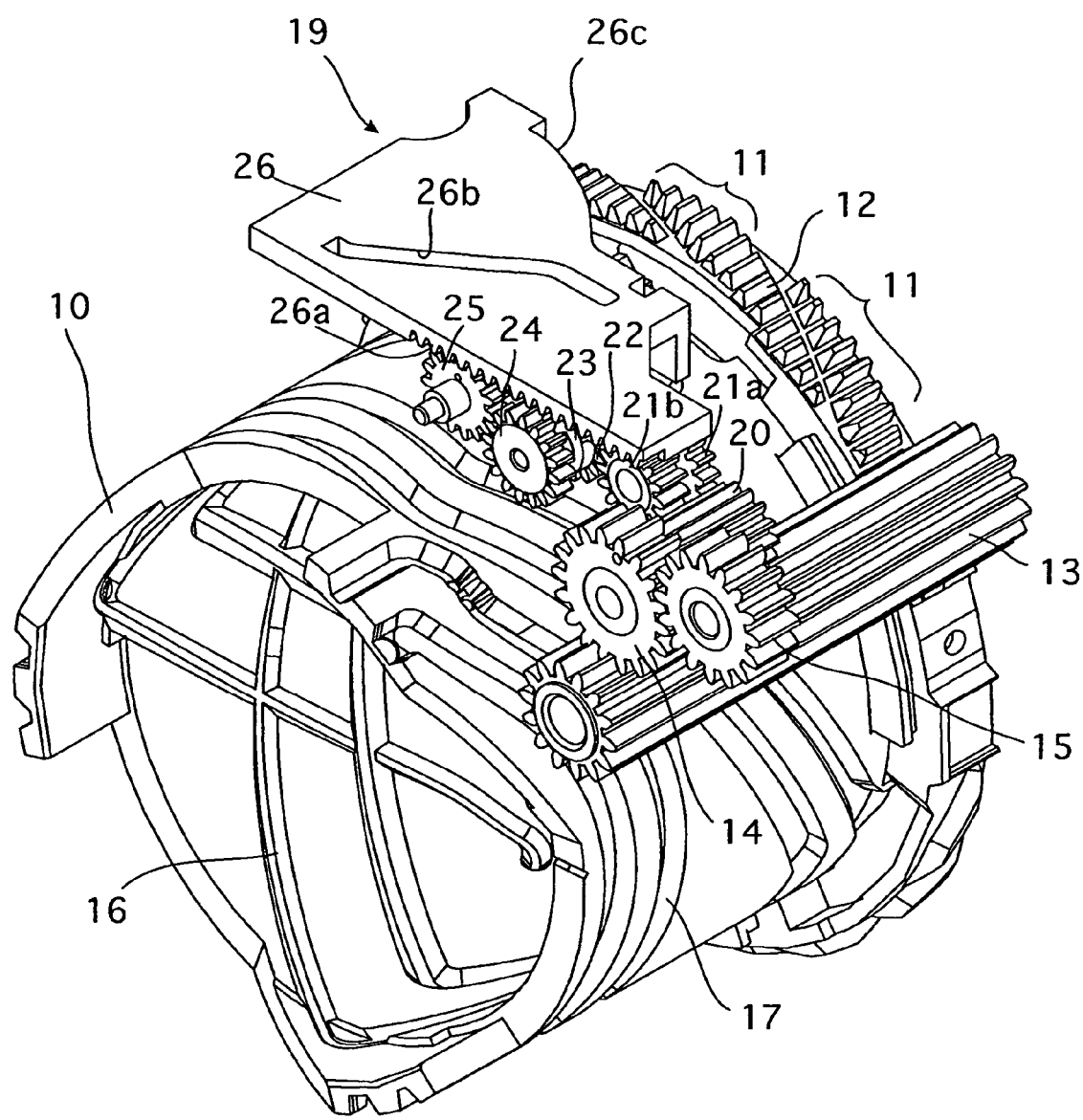
FIG. 5 is a perspective view of elements of a drive mechanism for the photographing lens system and the viewfinder optical system which are shown in FIGS. 2 through 4.
Figure 6:
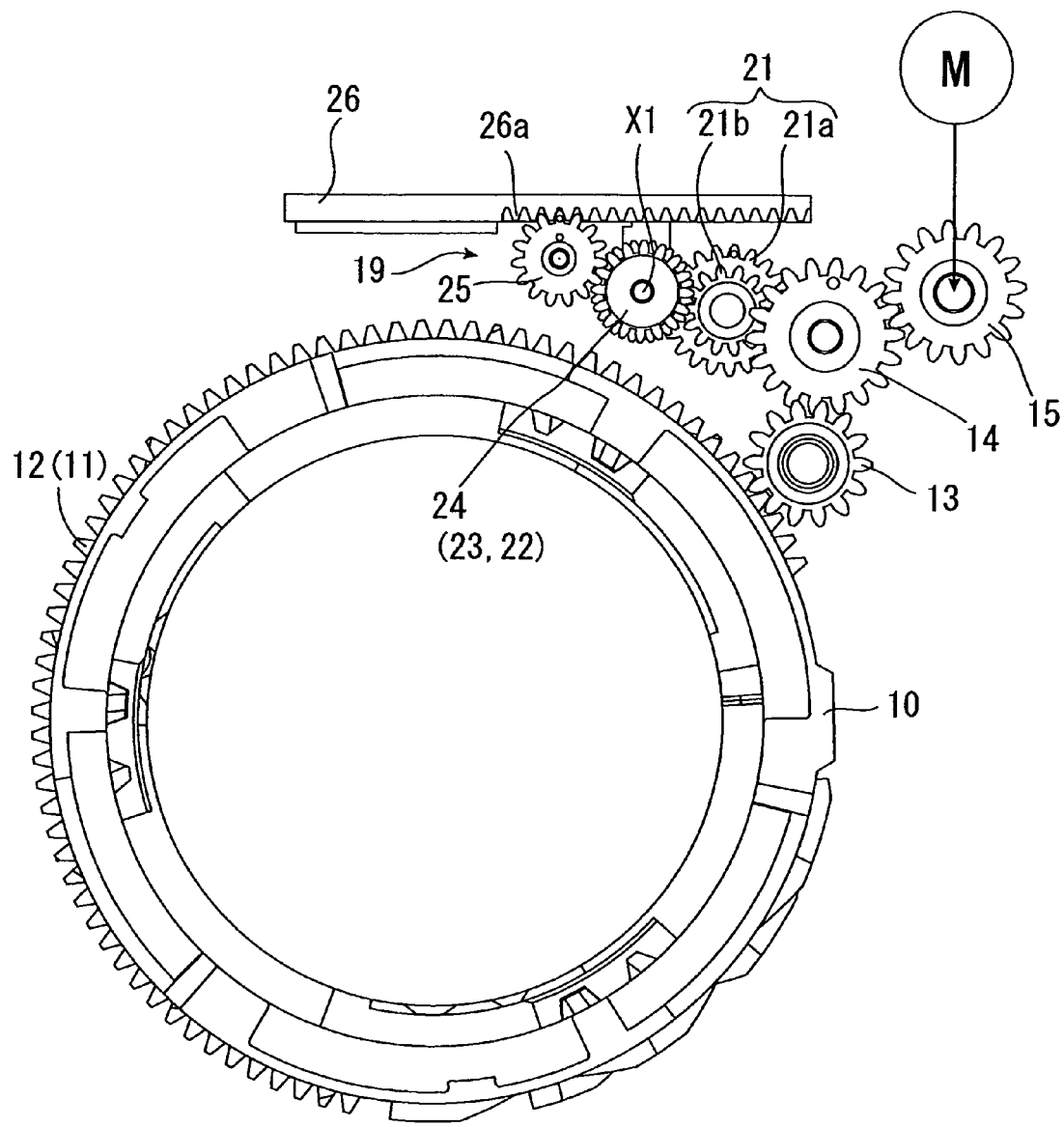
FIG. 6 is a front elevational view of the elements of the drive mechanism which are shown in FIG. 5.

FIGS. 5 and 6 show elements of a drive mechanism (rotation transfer mechanism) for driving the photographing lens system and the viewfinder optical system of the zoom lens camera 40 in association with each other by transmitting rotation of a rotational ring to an associated member. The zoom lens camera 40 is provided in the camera body 41 with a cam ring (rotational ring) 10 which is rotatable about the optical axis PZ. The cam ring 10 is provided, on an outer peripheral surface thereof in the vicinity of a rear end of the cam ring 10, with a male helicoid 11 which is formed on a predetermined area on the outer peripheral surface of the cam ring 10 in the optical axis direction (i.e., the direction of the optical axis PZ). The zoom lens camera 40 is provided around the cam ring 10 with a support ring (not shown). This support ring is provided on an inner peripheral surface thereof with a female helicoid which is engaged with the male helicoid 11 of the cam ring 10. The cam ring 10 is provided on threads of the male helicoid 11 with a spur gear 12 which includes threads extending parallel to the optical axis Pz. The spur gear 12 is in mesh with a zoom gear 13. The zoom gear 13 is rotatably fitted on a shaft (not shown) extending parallel to the axis of rotation of the cam ring 10, and is in mesh with a spur gear (pinion) 14. The spur gear 14 is in mesh with another spur gear (pinion) 15. The spur gears 14 and 15 are elements of a reduction gear train for transferring a driving force of a zoom motor M (see FIG. 6) to the zoom gear 13. The rotational axes of the spur gears 14 and 15 are parallel to the rotational axis of the zoom gear 13. Accordingly, a rotation of the zoom motor M causes the zoom gear 13 to rotate, and this rotation of the zoom gear 13 causes the cam ring 10 to rotate by engagement of the zoom gear 13 with the spur gear 12. When rotated, the cam ring 10 moves along the optical axis PZ (along the axis of rotation of the cam ring 10) while rotating due to engagement of the male helicoid 11 that is formed on an outer peripheral surface of the cam ring 10 with the female helicoid that is formed on an inner peripheral surface of the aforementioned support ring (not shown). The zoom gear 13 is formed to have a long length in the optical axis direction so as to remain engaged with the spur gear 12 even if the cam ring 10 moves along the optical axis PZ.

The cam ring 10 is provided on an inner peripheral surface and an outer peripheral surface thereof with a plurality of inner cam grooves 16 and a plurality of outer cam grooves 17, respectively. Two support members (not shown) which respectively support the first lens group PL1 and the second lens group PL2 are linearly guided along the optical axis Pz without rotating. A plurality of cam followers formed on the support member for the first lens group PL1 are respectively engaged in the plurality of outer cam grooves 17, while another plurality of cam followers formed on the support member for the second lens group PL2 are respectively engaged in the plurality of inner cam grooves 16. A rotation of the cam ring 10 causes the first lens group PL1 to move along the optical axis PZ in a predetermined moving manner which is determined by the resultant of a movement of the cam ring 10 itself along the optical axis PZ due to the aforementioned male and female helicoids and another movement given by the engagement of the plurality of outer cam grooves 17 with the associated plurality of cam followers, and at the same time, causes the second lens group PL2 to move along the optical axis PZ in a predetermined moving manner which is determined by the resultant of a movement of the cam ring 10 itself along the optical axis PZ due to the aforementioned male and female helicoids and another movement given by the engagement of the plurality of inner cam grooves 16 with the associated plurality of cam followers. The shutter PA is moved together with the second lens group PL2. The aforementioned male and female helicoids, the outer cam grooves 17 and the associated cam followers, the inner cam grooves 16 and the associated cam followers constitute an optical-element drive mechanism.

The viewfinder optical system is driven in association with a zooming operation of the photographing optical system via a zooming-association mechanism 19. The zooming-associating mechanism 19 is provided with a spur gear (pinion) 20, a double gear 21, a first clutch gear (master rotational member) 22, an intermediate clutch member (rotational member) 23, a second clutch gear (slave rotational member) 24, a spring-biased gear (pinion) 25 and a cam plate 26. Respective rotational axes of the spur gear 20, the double gear 21, the first clutch gear 22, the intermediate clutch member 23, the second clutch gear 24 and the spring-biased gear 25 are parallel to the axis of rotation of the zoom gear 13.

Figure 7:
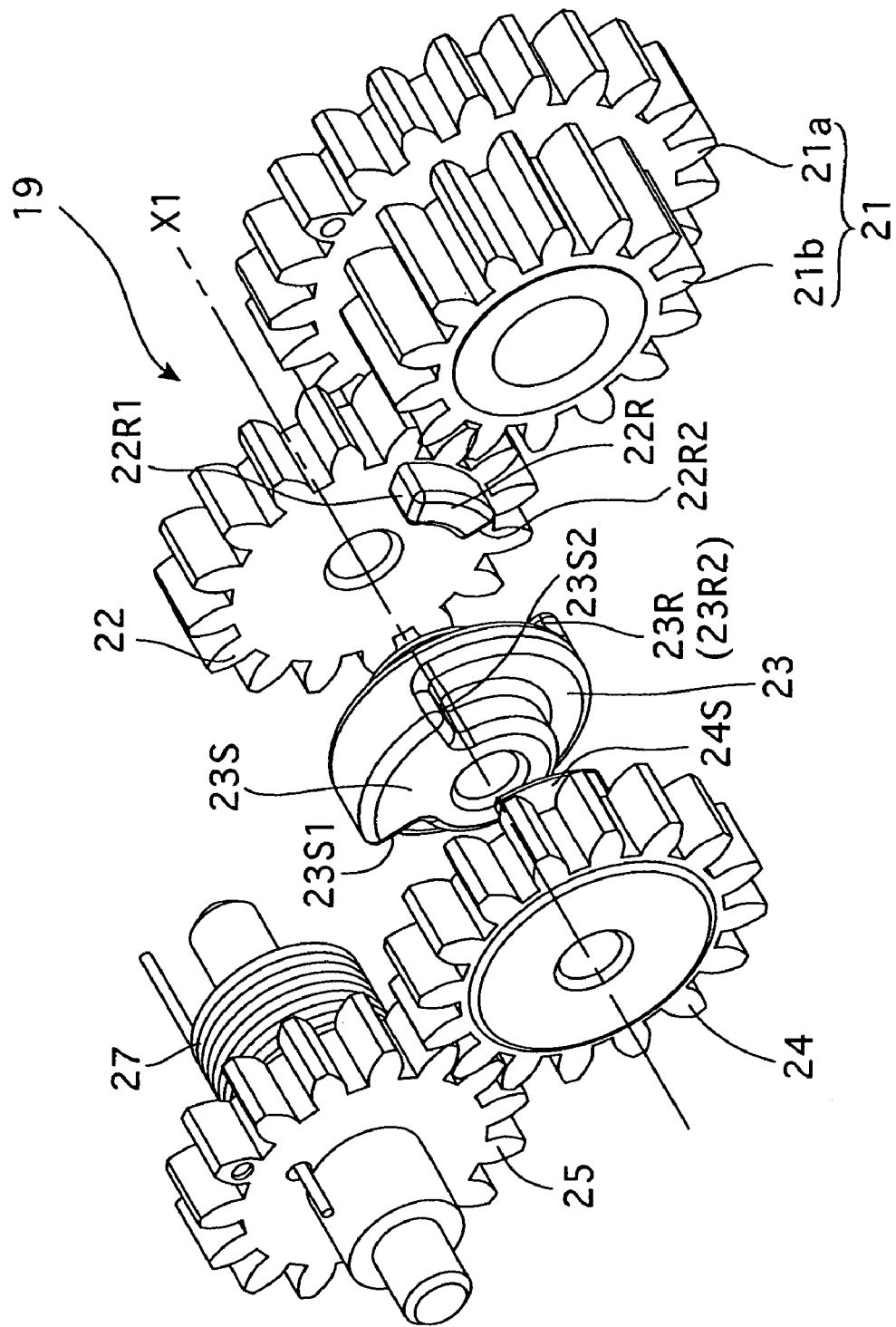
FIG. 7 is a perspective view of elements of a zooming-associating mechanism, included in the drive mechanism shown in FIGS. 5 and 6, for driving the viewfinder optical system in association with a zooming operation of the photographing optical system, viewed from an obliquely front side.
Figure 8:
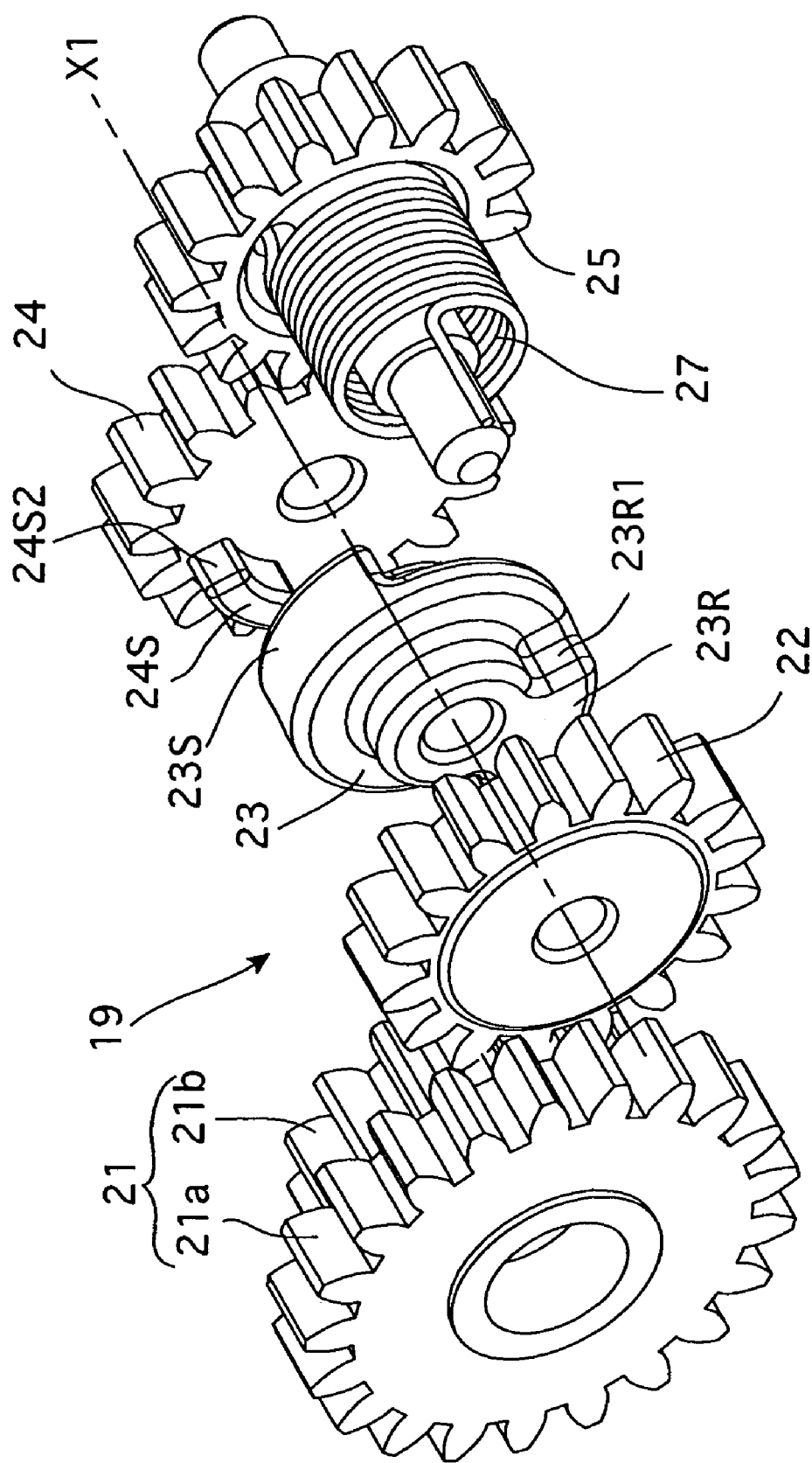
FIG. 8 is a perspective view of the elements of the zooming-associating mechanism which are shown in FIG. 7, viewed from an obliquely rear side.

The spur gear 20 is in mesh with the zoom gear 13. As shown in FIGS. 7 and 8, the double gear 21 is provided with a large spur gear portion 21a and a small spur gear portion 21b which are coaxially formed integral with each other. The large spur gear portion 21a is in mesh with the spur gear 20, while the small spur gear portion 21b is in mesh with the first clutch gear 22. The first clutch gear 22, the intermediate clutch member 23 and the second clutch gear 24, all of which are rotational members, are fitted on a common rotational shaft (common rotational axis) X1 to be freely rotatable thereon in a manner so that the intermediate clutch member 23 is sandwiched between the first clutch gear 22 and the second clutch gear 24. The first clutch gear 22 is provided on a surface thereof, facing the intermediate clutch member 23 with a rotation transfer projection (rotation transfer portion) 22R, while the second clutch gear 24 is provided on a surface thereof facing the intermediate clutch member 23 with a rotation transfer projection (rotation transfer portion) 24S. The first clutch gear 22 and the second clutch gear 24 have the same shape and size. On the other hand, the intermediate clutch member 23 is provided on a surface thereof facing the first clutch gear 22 with a first rotation transfer projection (rotation transfer portion) 23R. The intermediate clutch member 23 is further provided on another surface thereof facing the second clutch gear 24 with a second rotation transfer projection (rotation transfer portion) 23S. The second clutch gear 24 is in mesh with the spring-biased gear 25. A torsion coil spring (biasing member) 27 is fitted on a shaft on which the spring-biased gear 25 is rotatably fitted. The cam plate 26 is provided on a surface thereof facing the cam ring 10 with a rack 26a which extends linearly in a direction orthogonal to the rotational shaft X1. The rack 26a is in mesh with the spring-biased gear 25, and the cam plate 26 is supported by a support member (not shown) to be linearly guided in a direction orthogonal to the axis of rotation of the spring-biased gear 25 (i.e., a direction parallel to the optical axes PZ and FZ).

The cam plate 26 is provided with a cam slot 26b and a cam edge 26c positioned behind the cam slot 26b. The first lens group FL1 is supported by a first lens holder 30 having a cam follower 30a which is engaged in the cam slot 26b. The second lens group FL2 is held by a second lens holder 31 having a cam follower 31a which is engaged with the cam edge 26c. The second lens holder 31 is biased forwardly along the optical axis FZ to make the cam follower 31a remain in contact with the cam edge 26c. The first lens holder 30 and the second lens holder 31 are linearly guided along the optical axis FZ, and move along the optical axis FX in predetermined respective moving manners in accordance with contours of the cam slot 26b and the cam edge 26c, respectively.

When the photographing optical system performs a zooming operation in a ready-to-photograph state at any focal length between wide-angle extremity shown in FIG. 3 and telephoto extremity shown in FIG. 4, the first lens group FL1 and the second lens group FL2 are driven along the optical axis FZ relative to each other in association with the zooming operation of the photographing optical system. On the other hand, the viewfinder optical system does not have to be associated with the photographing optical system when positioned between the retracted position shown in FIG. 2 and wide-angle extremity shown in FIG. 3 since a photographing operation is not performed when the photographing optical system is positioned between the retracted position shown in FIG. 2 and wide-angle extremity shown in FIG. 3. It is desirable, from the viewpoint of miniaturization of the viewfinder, that the viewfinder optical system be not unnecessarily driven when a photographing operation is not performed. In the present embodiment of the zoom lens camera, respective operations of the photographing optical system and the viewfinder optical system which are controlled in association with each other will be hereinafter discussed in detail.

As shown in FIGS. 9 through 12, the first rotation transfer projection 23R and the second rotation transfer projection 23S of the intermediate clutch member 23 are positioned to be radially symmetrical with respect to the rotational shaft X1, on which the intermediate clutch member 23 rotates. The rotation transfer protection 22R of the first clutch gear 22 that is coaxial with the rotational shaft X1 to be supported thereby is positioned in a rotational moving path of the first rotation transfer projection 23R so that opposite end surfaces (a first end surface 22R1 and a second end surface 22R2) of the rotation transfer projection 22R in a rotational direction thereof move closer or away from opposite end surfaces (a first end surface 23R1 and a second end surface 23R2) of the first rotation transfer projection 23R in a rotational direction thereof when the first clutch gear 22 and the intermediate clutch member 23 rotate relative to each other. On the other hand, the rotation transfer projection 24S of the second clutch gear 24 that is coaxial with the rotational shaft X1 to be supported thereby is positioned in a rotational moving path of the second rotation transfer projection 23S so that opposite end surfaces (a first end surface 24S1 and a second end surface 24S2) of the rotation transfer projection 24S in a rotational direction thereof move closer or away from opposite end surfaces (a first end surface 23S1 and a second end surface 23S2) of the second rotation transfer projection 23S in a rotational direction thereof when the intermediate clutch member 23 and the second clutch gear 24 rotate relative to each other. Although the first clutch gear 22, the intermediate clutch member 23 and the second clutch gear 24 are illustrated to deviate from their original positions for the purpose of making their angular positions (rotational positions) easy to be visually recognized in FIGS. 9 through 12, the first clutch gear 22, the intermediate clutch member 23 and the second clutch gear 24 are actually positioned on the common rotational shaft X1.

Figure 9:
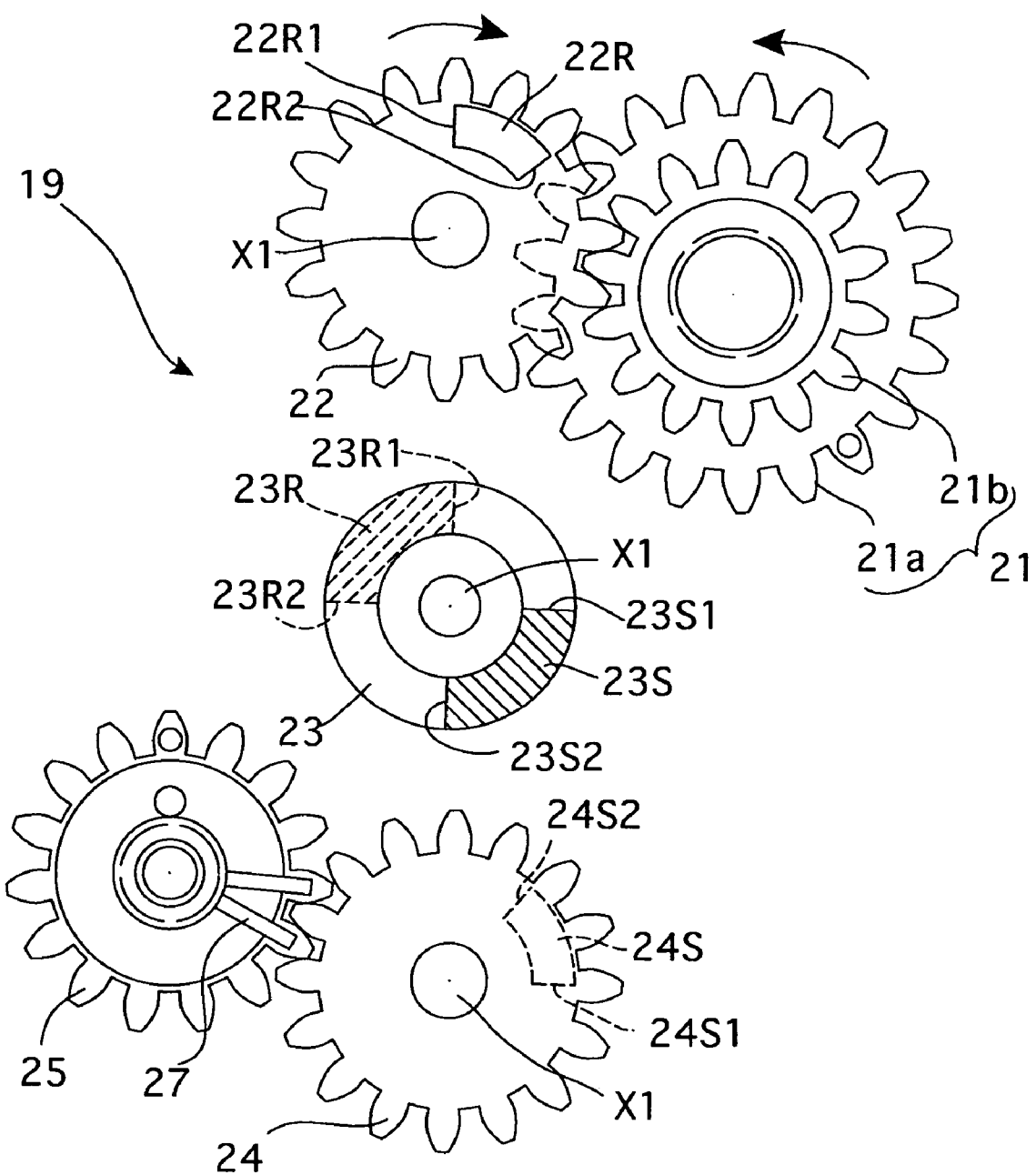
FIG. 9 is a front elevational view, partly exploded for clarity, of the elements of the zooming-associating mechanism which are shown in FIGS. 7 and 8 in the retracted state of the zoom lens.
Figure 10:
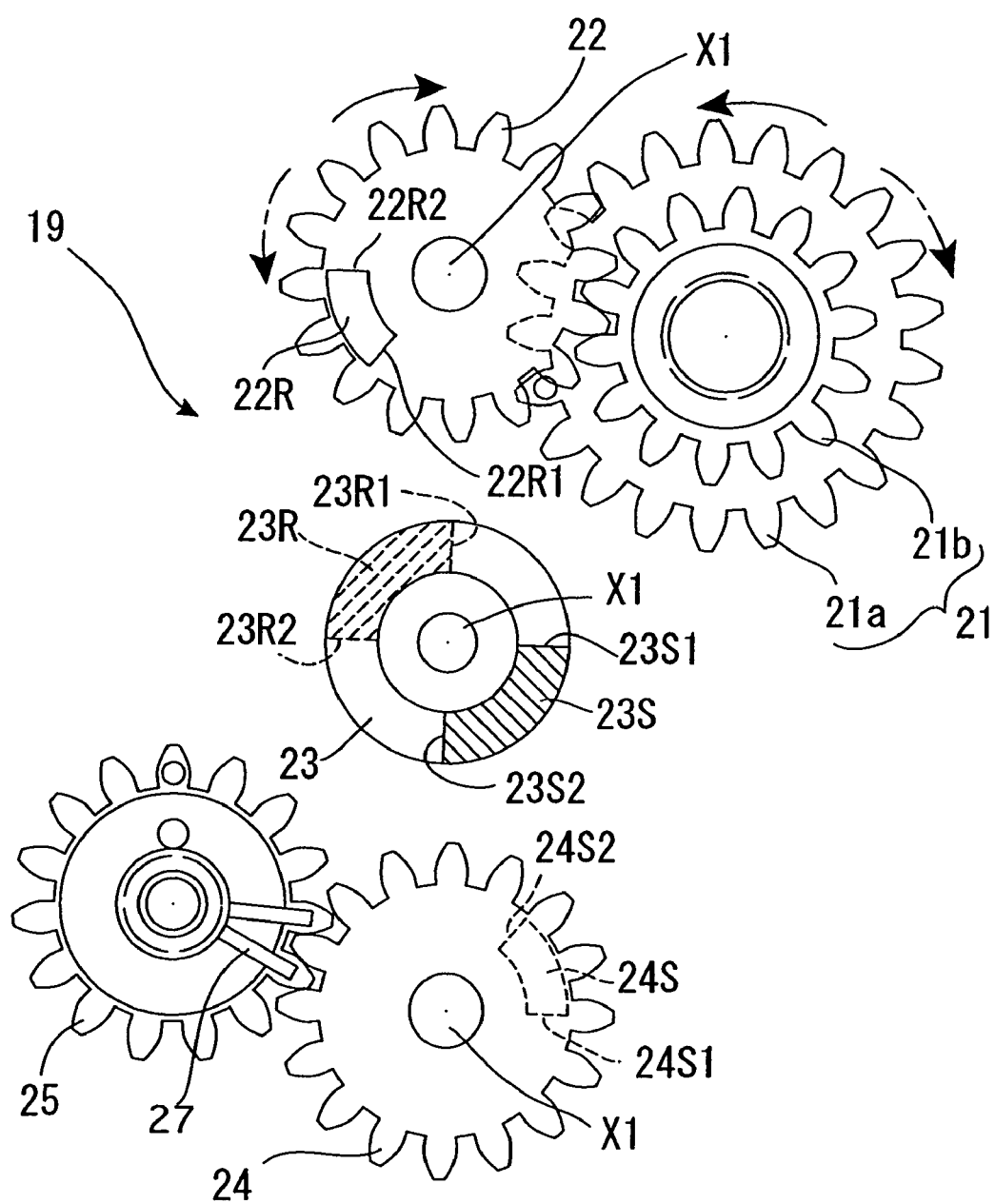
FIG. 10 is a view similar to that of FIG. 9, showing the elements of the zooming-associating mechanism which are shown in FIGS. 7 and 8 in a transitional state of the zoom lens from the retracted state to wide-angle extremity of the zoom lens.
Figure 11:
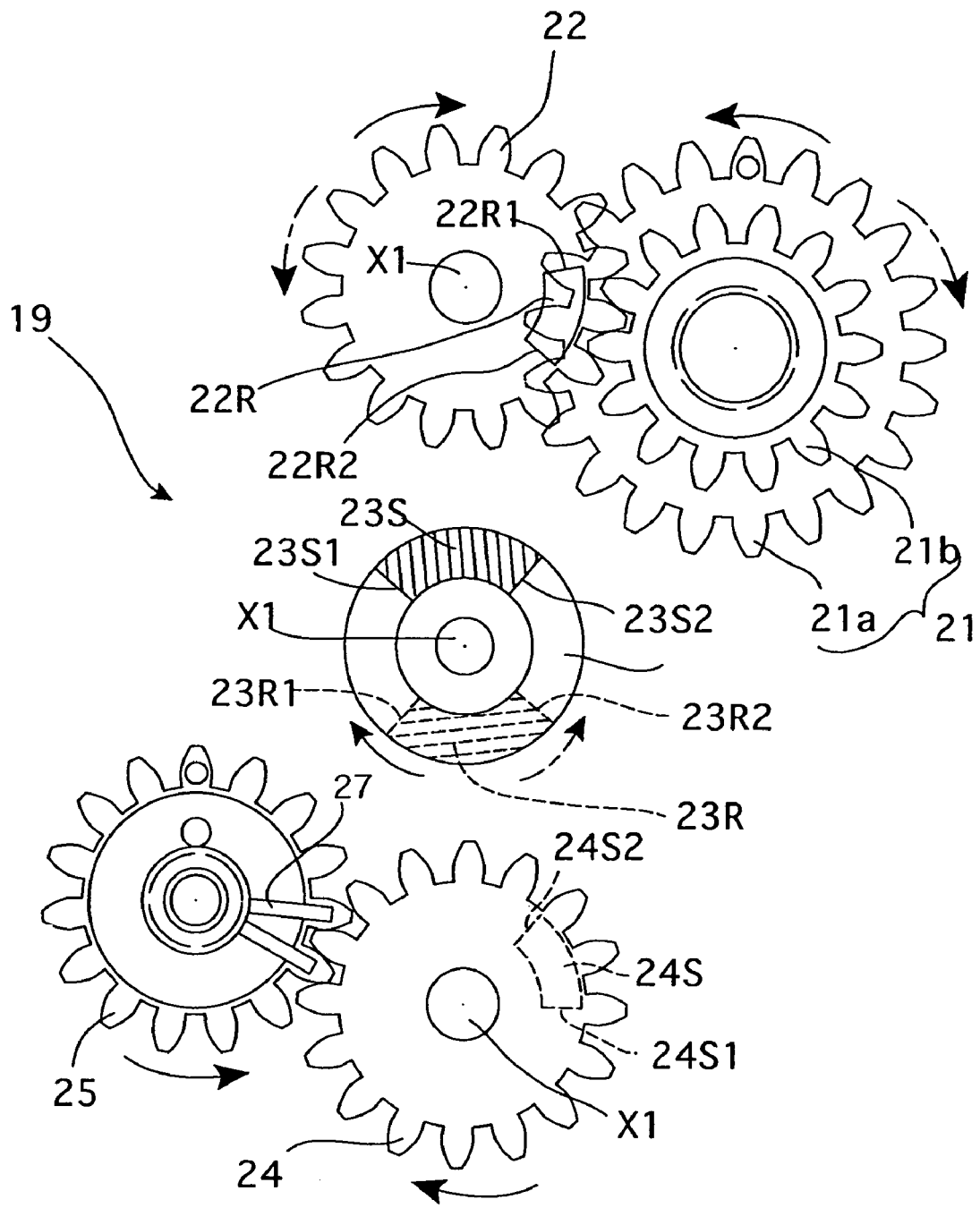
FIG. 11 is a view similar to that of FIG. 9, showing the elements of the zooming-associating mechanism which are shown in FIGS. 7 and 8 at wide-angle extremity of the zoom lens.
Figure 12:
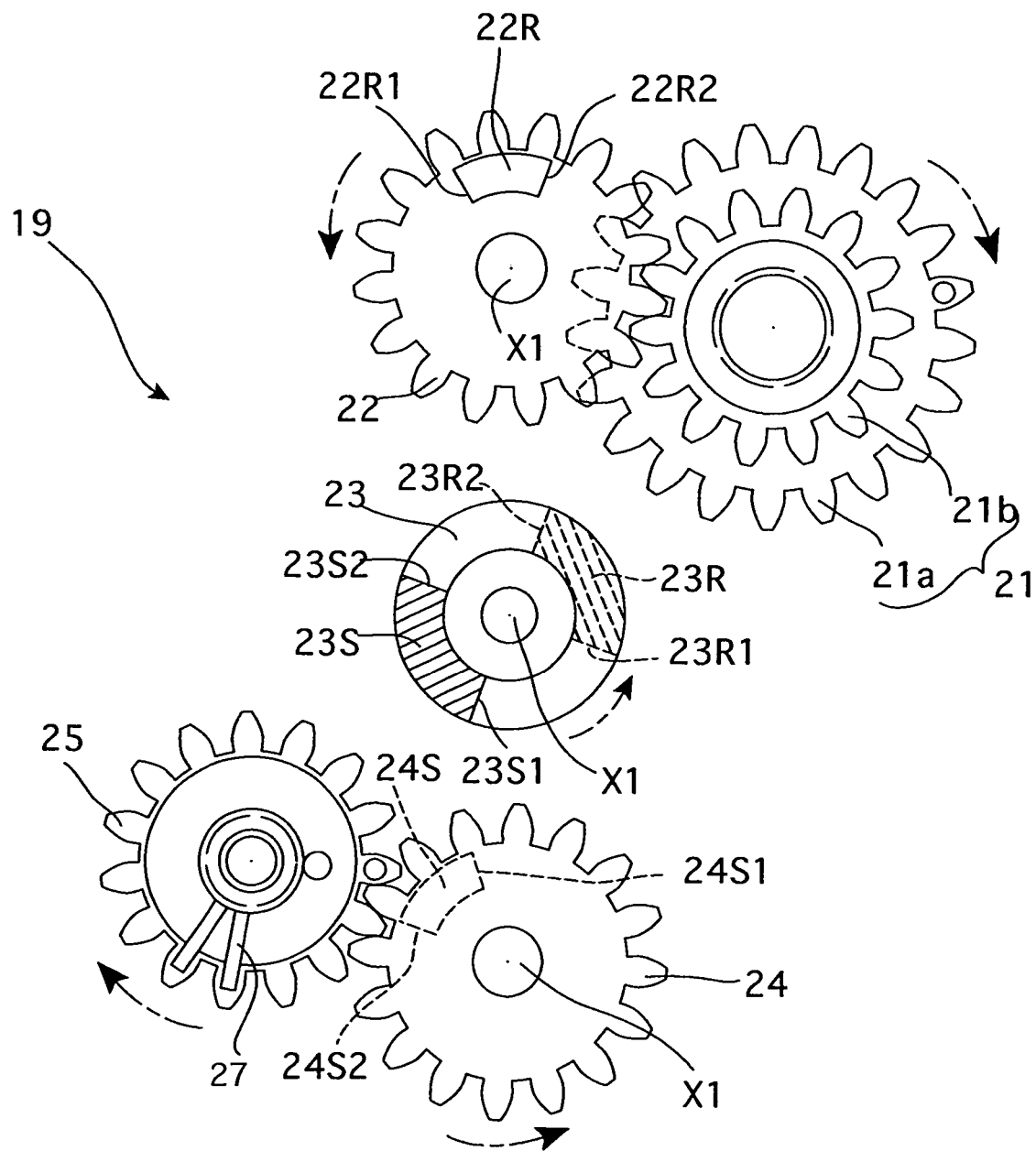
FIG. 12 is a view similar to that of FIG. 9, showing the elements of the zooming-associating mechanism which are shown in FIGS. 7 and 8 at telephoto extremity of the zoom lens.

FIG. 9 shows the elements of the zooming-associating mechanism 19 which are shown in FIGS. 7 and 8 in the retracted state of the photographing optical system, FIG. 10 shows the same elements in a transitional state of the photographing optical system between the retracted state and the wide-angle extremity, FIG. 11 shows the same elements at wide-angle extremity, and FIG. 12 shows the same elements at telephoto extremity. In FIGS. 9 through 12, rotational directions of the gears 21, 22, 24 and 25 and the intermediate clutch member 23 when the zoom lens 41 is advanced in a direction from the retracted position to telephoto extremity are shown by solid line arrows, and rotational directions of the gears 21, 22, 24 and 25 and the intermediate clutch member 23 when the zoom lens 41 is retracted in a direction from telephoto extremity to the retracted position are shown by one-dot chain line arrows.

In the retracted state shown in FIG. 9, the first end surface 22R1 of the rotation transfer projection 22R that projects from the first clutch gear 22 is in contact with the first end surface 23R1 of the first rotation transfer projection 23R that projects from the intermediate clutch member 23, while the first end surface 24S1 of the rotation transfer projection 24S that projects from the second clutch gear 24 is in contact with the first end surface 23S1 of the second rotation transfer projection 23S that projects from the intermediate clutch member 23. The zooming-associating mechanism 19 is provided with a stop member (not shown) by which the second clutch gear 24 is prevented from rotating counter-clockwise as viewed in FIG. 9 beyond the angular position shown in FIG. 9, and the biasing force of the torsion coil spring 27 causes the second clutch gear 24 to rotate in a direction to come into contact with the stop member. The double gear 21, the small spur gear portion 21b of which is in mesh with the first clutch gear 22, does not rotate unless the zoom motor M is actuated. Therefore, the gears 21, 22, 24 and 25 and the intermediate clutch member 23 remain in their respective angular positions shown in FIG. 9 when the zoom motor M is at rest.

Driving the zoom motor M to rotate in a lens barrel advancing direction thereof from the retracted state of the zoom lens 41 causes the zoom gear 13 to rotate in a lens barrel advancing direction thereof via the reduction gear train (the spur gears 14 and 15), thus causing the cam ring 10 to move forward along the optical axis PZ while rotating. At the same time the rotation of the zoom gear 13 causes the double gear 21 to rotate counterclockwise as viewed in FIG. 9 via the spur gear 20, which is in mesh with the zoom gear 13 and the large spur gear portion 21a of the double gear 21. Subsequently, this counterclockwise rotation of the double gear 21 causes the first clutch gear 22, which is in mesh with the small spur gear portion 21b of the double gear 21, to rotate clockwise as viewed in FIG. 9. Because the direction of this clockwise rotation of the first clutch gear 22 causes the first end surface 22R1 of the rotation transfer projection 22R to move away from the first end surface 23R1 of the first rotation transfer projection 23R while the second end surface 22R2 of the rotation transfer projection 22R and the second end surface 23R2 of the first rotation transfer projection 23R are positioned away from each other in a rotational direction about the rotational shaft X1, the rotation transfer projection 22R of the first clutch gear 22 does not come into contact with the first rotation transfer projection 23R of the intermediate clutch member 23 for a while upon the commencement of the rotation of the first clutch gear 22, so that the clockwise rotation of the first clutch gear 22 is not transferred to the intermediate clutch member 23 during this time. If the intermediate clutch member 23 does not rotate, the second clutch gear 24 and the spring-biased gear 25, which follow the intermediate clutch member 23, do not rotate either, and the zoom viewfinder is not driven accordingly.

Upon the first clutch gear 22 reaching the angular position thereof shown in FIG. 10 after idling relative to the intermediate clutch member 23 by a predetermined angle of rotation (approximately 220 degrees in this particular embodiment), the second end surface 22R2 of the rotation transfer projection 22R comes in contact with the second end surface 23R2 of the first rotation transfer projection 23R. Upon contact of the second end surface 22R2 with the second end surface 23R2, the intermediate clutch member 23 integrally rotates together with the first clutch gear 22 clockwise as viewed in FIG. 10. However, this clockwise rotation of the intermediate clutch member 23 causes the first end surface 23S1 of the second rotation transfer projection 23S to move away from the first end surface 24S1 of the rotation transfer projection 24S while the second end surface 23S2 of the second rotation transfer projection 23S and the second end surface 24S2 of the rotation transfer projection 24S are positioned away from each other in a rotational direction about the rotational shaft X1, the second rotation transfer projection 23S of the intermediate clutch member 23 does not come into contact with the rotation transfer projection 24S of the second clutch gear 24 for a while upon the commencement of the rotation of the intermediate clutch member 23 so that the clockwise rotation of the intermediate clutch member 23 is not transferred to the second clutch gear 24 during this time.

Upon the intermediate clutch member 23 reaching the angular position thereof shown in FIG. 11 after idling relative to the second clutch member 24 (together with the first clutch gear 22) by a predetermined angle of rotation (approximately 220 degrees in this particular embodiment), the second end surface 23S2 of the second rotation transfer projection 23S comes in contact with the second end surface 24S2 of the rotation transfer projection 24S. At this stage, the photographing optical system is at wide-angle extremity. Upon this contact of the second end surface 23S2 with the second end surface 23R2, a clockwise rotation of the intermediate clutch member 23 as viewed in FIG. 11 is transferred to the second clutch gear 24 so that the second clutch gear 24 rotates together with both the first clutch gear 22 and the intermediate clutch member 23 clockwise as viewed in FIG. 11. This clockwise rotation of the second clutch gear 24 causes the spring-biased gear 25, which is in mesh with the second clutch gear 24, to rotate counterclockwise as viewed in FIG. 11. This rotation of the spring-biased gear 25 causes the cam plate 26 to move linearly. Consequently, the first lens group FL1 and the second lens group FL2 of the viewfinder optical system move along the optical axis FZ while changing the distance therebetween to perform a zooming operation in a direction from the wide-angle extremity toward the telephoto extremity in accordance with a zooming operation of the photographing optical system. In order to stabilize the operation of the viewfinder optical system, it is possible to modify the illustrated embodiment of the zooming-associating mechanism 19 in a manner so that a clockwise rotation of the intermediate clutch member 23 as viewed in FIG. 11 is transferred to the second clutch gear 24 slightly before the photographing optical system reaches the wide-angle extremity.

The first clutch gear 22, the intermediate clutch member 23 and the second clutch gear 24 integrally rotate on the rotational shaft X1 over a zooming range from the wide-angle extremity position shown in FIG. 11 to telephoto extremity position shown in FIG. 12 so that the spring-biased gear 25 rotates. Rotation of the spring-biased gear 25 in a direction toward the telephoto extremity (counterclockwise as viewed in FIG. 11) from the angular position shown in FIG. 11 at the wide-angle extremity causes the torsion coil spring 27 to flex correspondingly, and the amount of flexing of the torsion coil spring 27 becomes maximum at the telephoto extremity shown in FIG. 12. Therefore, the spring-biased gear 25 is continuously acted upon by a rotational biasing force (clockwise force as viewed in FIG. 12) so as to return the spring-biased gear 25 back to the angular position thereof at wide-angle extremity (the angular position shown in FIG. 11) in a zooming range beyond the wide-angle extremity toward the telephoto-extremity by the resiliency of the torsion coil spring 27. However, if the zoom motor M stops at any focal length during a zooming operation in a direction from wide-angle extremity toward telephoto extremity, the double gear 21 is prohibited from rotating, and accordingly, the first clutch gear 22, the intermediate clutch member 23, the second clutch gear 24 and the spring-biased gear 25 are not rotated by the biasing force of the torsion coil spring 27, and are therefore held at their respective angular positions at which the zoom motor M stops.

Driving the zoom motor M in a direction to retract the zoom lens barrel 42 from any focal length except for the wide-angle extremity causes the double gear 21 to rotate clockwise as viewed in FIGS. 9 through 12, i.e., in a reverse rotational direction at the operation advancing the zoom lens barrel 42. This clockwise rotation of the double gear 21 causes the first clutch gear 22, which is in mesh with the double gear 21, to rotate counterclockwise. This counterclockwise rotational direction of the first clutch gear 22 causes the second end surface 22R2 of the rotation transfer projection 22R to move away from the second end surface 23R2 of the first rotation transfer projection 23R. However, the intermediate clutch member 23 and the second clutch gear 24 rotate together with first clutch gear 22 because the spring-biased gear 25, the second clutch gear 24 and the intermediate clutch member 23 are biased so as to rotate in association with the rotational direction of the first clutch gear 22 by the resiliency of the torsion coil spring 27. This causes the spring-biased gear 25 to rotate in a rotational direction reverse to the rotational direction thereof at the time of a zooming operation from the wide-angle extremity to telephoto extremity, to thereby move the cam plate 26. Consequently, the first lens group FL1 and the second lens group FL2 move along the optical axis FZ while changing the distance therebetween to perform a zooming operation in association with a zooming operation of the photographing optical system. Similar to the case at the time of a zooming operation in a direction from the wide-angle extremity toward the telephoto extremity, if the zoom motor M stops at any focal length during a zooming operation in a direction from telephoto extremity toward the wide-angle extremity, the double gear 21 is prohibited from rotating, and accordingly, the first clutch gear 22, the intermediate clutch member 23, the second clutch gear 24 and the spring-biased gear 25 are not rotated by the biasing force of the torsion coil spring 27, and are therefore held at their respective angular positions at the stop time of the zoom motor M. Consequently, the first lens group FL1 and the second lens group FL2 stop moving.

In a zooming operation in a direction toward the wide-angle extremity from the telephoto extremity side, a rotation of the first clutch gear 22 to the angular position thereof at the wide-angle extremity causes the second clutch gear 24 to come into contact with the aforementioned stop member (not shown), thus stopping rotations of the second clutch gear 24 and the spring-biased gear 25 which are caused by the rotation of the first clutch gear 22. In addition, this stop of the second clutch gear 24 stops the biasing force of the torsion coil spring 27 which exerts on the intermediate clutch member 23, thus causing the intermediate clutch member 23 to stop rotating. Thereafter, driving the zoom motor M in a direction to further retract the zoom lens barrel 42 from wide-angle extremity causes the first clutch gear 22 to continue rotating counterclockwise as viewed in FIG. 11 so that the second end surface 22R2 of the rotation transfer projection 22R gradually moves away from the second end surface 23R2 of the first rotation transfer projection 23R. At this stage, the intermediate clutch 23 remains at the angular position thereof at which the second end surface 23S2 of the second rotation transfer projection 23S is in contact with the second end surface 24S2 of the rotation transfer projection 24S. Immediately after the first clutch gear 22 rotates (idles) relative to the intermediate clutch member 23 by a predetermined amount of rotation, the first end surface 22R1 of the rotation transfer projection 22R comes into contact with the first end surface 23R1 of the first rotation transfer projection 23R, and thereafter the intermediate clutch member 23 rotates together with the first clutch gear 22. This rotation of the intermediate clutch 23 together with the first clutch gear 22 causes the second end surface 23S2 of the second rotation transfer projection 23S to move away from the second end surface 24S2 of the rotation transfer projection 24S, and at the same time, causes the first end surface 23S1 of the second rotation transfer projection 23S to approach the first end surface 24S1 of the rotation transfer projection 24S as the intermediate clutch 23 idles relative to the second clutch gear 24 which stands still.

When the zoom lens barrel 42 is fully retracted and the zoom motor M stops rotating, the first clutch gear 22, the intermediate clutch gear 23 and the second clutch gear 24 are positioned as shown in FIG. 9, in which the first end surface 23S1 of the second rotation transfer projection 23S is in contact with the first end surface 24S1 of the rotation transfer projection 24S. As can be seen from a comparison of FIGS. 9 and 11, the second clutch gear 24 stands still even though the first clutch gear 22 continues to rotate in an advancing/retracting range (non-photographing range) of the photographing optical system between the wide-angle extremity and the retracted position. Accordingly, the interconnection mechanism between the viewfinder optical system and the photographing optical system is released in the advancing/retracting range between the wide-angle extremity and the retracted position.

As can be understood from the above descriptions, according to the above illustrated embodiment of the zoom lens camera, the interconnection mechanism between the viewfinder optical system and the photographing optical system is released in the advancing/retracting range of the photographing optical system between the wide-angle extremity and the retracted position by rotating the first clutch gear 22, the intermediate clutch member 23 and the second clutch gear 24, which are positioned coaxially on a common axis (the rotational shaft X1), relative to one another in predetermined respective rotating manners so that the zoom viewfinder is not driven in association with a zooming operation of the photographing optical system. A conventional zooming-associating mechanism of a zoom lens camera with an association releasing function for releasing association (interconnection/linkage) between a viewfinder optical system and a photographing optical system of the zoom lens camera, wherein a cam surface or a cam edge of a cam member corresponding to the cam member 26 of the present embodiment of the zoom lens camera is provided with a non-driving cam range by which movable lens groups (such as the first lens group FL1 and the second lens group FL2 of the present embodiment of the zoom lens camera) of the viewfinder optical system are not driven in association with either a forward movement or a rearward movement of the cam member, is known in the art. However, in this conventional zooming-associating mechanism having the cam member with such a non-driving cam range, the cam member is driven every time the movable lens groups of the photographing optical system are driven regardless of whether the association (interconnection/linkage) between the viewfinder optical system and the photographing optical system is released or not. This requires a large space for securing the wide moving range of the cam member, thus becoming an obstacle to a miniaturization of the zoom lens camera. Unlike this conventional zooming-associating mechanism, the present embodiment of the zooming-associating mechanism 19 requires only a minimum space for securing the moving range of the cam plate 26 because the cam plate 26 is driven only when the viewfinder optical system needs to be driven in association with an operation of the photographing optical system.

Specifically, in the present embodiment of the rotation transfer mechanism, the number of rotational members which are coaxially positioned and rotated relative to one another is three, and relative rotations (idle rotations) among the three rotational members are made possible in two stages, specifically a relative rotation between the first clutch gear 22 and the intermediate clutch member 23 at one stage, and another relative rotation between the intermediate clutch member 23 and the second clutch gear 24 at another stage. This allows the rotation transfer mechanism to adequately cope, even if the maximum amount of advancing movement of the zoom lens barrel 42 from the retraced position to the wide-angle extremity is large, i.e., even if the maximum amount of rotation of the zoom gear 13 is large. In other words, the preset invention is particularly effective for a zoom lens camera having a retractable zoom lens whose amount of advancing movement from the retracted position to a ready-to-photograph position (e.g., wide-angle extremity) is large.

Although the number of the rotational members which are coaxially positioned and rotated relative to one another is three in the above illustrated embodiment of the rotation transfer mechanism, the number of the rotational members can be more than three if it is desired to increase the maximum angle of relative rotation among the rotational members for releasing the association between the photographing optical system and the viewfinder optical system. If the number of the rotational members is four or more, the zooming-associating mechanism only needs to be provided with a plurality of members each of which corresponds to the intermediate clutch member 23 of the above illustrated embodiment of the zooming-associating mechanism 19.

Although described above in detail with reference to the accompanying drawings, the present invention is not limited solely to the particular embodiment described above. For instance, although the flat cam plate 26 serves as a member for driving movable lens groups of the viewfinder optical system in the above described embodiment, the flat cam plate 26 can be replaced by a cylindrical cam member which serves as an alternative driving member.

Although the above described embodiment of the zooming-associating mechanism 19 is provided with the aforementioned stop member (not shown), by which the second clutch gear 24 is prohibited from rotating counterclockwise as viewed in FIG. 9 beyond the angular position shown in FIG. 11 at wide-angle extremity of the zoom lens, such a stop member can be omitted if the torsion coil spring 27 is released from being flexed upon the second clutch gear 24 reaching the angular position thereof shown in FIG. 11 (also shown in FIGS. 9 and 10).

The present invention can be applied not only to a zoom viewfinder of a zoom lens camera such as the viewfinder of the above described embodiment of the zoom lens camera but also to a zoom flash which varies its angle of illumination in association with a zooming operation of the photographing optical system. Specifically, the first lens group FL1 and the second lens group FL2 of the viewfinder optical system of the above described embodiment of the zoom lens camera can be used as those of a zoom flash which are moved to vary the angle of illumination thereof in association with a zooming operation of the photographing optical system.

The present invention can be applied not only to a drive mechanism for driving the photographing lens system with a cam ring which rotates while moving along the optical axis of the photographing lens system, such as the drive mechanism (rotation transfer mechanism) of the above described embodiment of the zoom lens camera, but also to any other drive mechanism for driving the photographing lens system. For instance, a zoom lens camera in which a zooming operation is performed with a cam ring which rotates at a fixed position without moving along the optical axis of the photographing optical system is known in the art, and the present invention can be applied to this type of zoom lens camera. The present invention can be applied to a zoom lens camera in which the photographing optical system thereof is driven by a drive mechanism using no cam ring.

In addition, the present invention can be applied not only to a rotation transfer mechanism like the rotation transfer mechanism incorporated in the above described embodiment of the zoom lens camera, but also to a rotation transfer mechanism incorporated in a mechanical device other than a zoom lens camera.

As can be understood from the foregoing, according to the present invention, a zoom lens camera is achieved which includes a zooming-associated driven member which is driven in association with a zooming operation of a photographing optical system, and an associating mechanism for associating the zooming-associated driven member with a photographing optical system, wherein the associating mechanism selectively switches between an association state in which the zooming-associated driven member is driven in association with the zooming operation and an association released state in which the zooming-associated driven member is not driven in association with the zooming operation, and wherein the associating mechanism can be constructed as a small and compact mechanism.

In addition, according to the present invention, a rotation transfer mechanism for transmitting rotation of a rotational ring to an associated member to move the associated member in association with the rotation of the rotational ring is achieved, wherein the rotation transfer mechanism can selectively switched between an association state, in which the associated member is driven in association with rotation of the rotational ring, and an association released state in which the associated member is not driven in association with rotation of the rotational ring, and wherein the rotation transfer mechanism can be constructed as a small and compact mechanism.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens camera comprising:

an optical-element drive mechanism for driving optical elements of a photographing optical system along an optical axis thereof to perform a zooming operation in a ready-to-photograph state, and a retracting operation in which said photographing optical system is retracted to change from said ready-to-photograph state to a retracted state; and a zooming-associating mechanism for associating at least one zooming-associated driven member with said zooming operation so that said zooming-associated driven member is driven by said optical-element drive mechanism in association with said zooming operation in said ready-to-photograph state, and for releasing said association of said zooming-associated driven member with said zooming operation during a transitional state between said ready-to-photograph state and said retracted state;

wherein said zooming-associating mechanism includes at least three rotational members which are coaxially positioned on a common rotational axis to be rotatable thereon relative to one another, wherein said three rotational members include a master rotational member and a slave rotational member which are positioned at opposite ends of said common rotational axis, respectively, said master rotational member being associated with said optical-element drive mechanism to rotate, said slave rotational member driving said zooming-associated driven member by a rotation thereof, wherein each opposed surfaces of any two adjacent rotational members of said three rotational members include a rotation transfer portion, said rotation transfer portions being engaged with each other at predetermined relative angular positions thereof so that said any two adjacent rotational members integrally rotate, said any two adjacent rotational members being allowed to rotate relative to each other at relative angular positions thereof other than said predetermined relative angular positions, and wherein said slave rotational member rotates together with said master rotational member after relative rotations among said any two adjacent rotational members occur in sequence when said photographing optical system changes from said retracted state to said ready-to-photograph state.

2. The zoom lens camera according to claim 1, further comprising a biasing member for holding said slave rotational member at an angular position thereof at which said slave rotational member is held before being rotated together with said master rotational member.

3. The zoom lens camera according to claim 1, wherein said master rotational member and said slave rotational member are identical to each other in shape and size, and symmetrically positioned with respect to a plane orthogonal to said common rotational axis.

4. The zoom lens camera according to claim 1, wherein each of said two rotation transfer portions comprises a projection which projects from said opposed surface thereof, so that each of said two rotation transfer portions has opposite end surfaces in said rotational direction,
wherein one of said opposite end surfaces of one of said any two adjacent rotational members and one of said opposite end surfaces of the other of said any two adjacent rotational members are in contact with each other when said photographing optical system is in said retracted state, and
wherein the other of said opposite end surfaces of said one of said any two adjacent rotational members and the other of said opposite end surfaces of said other of said any two adjacent rotational members come into contact with each other after said any two adjacent rotational members rotate relative to each other when said photographing optical system changes from said retracted state to said ready-to-photograph state.

5. The zoom lens camera according to claim 1, wherein a peripheral surface of each of at least said master rotational member and said slave rotational member among said three rotational members comprises a gear portion.

6. The zoom lens camera according to claim 5, wherein said zooming-associating mechanism comprises:
at least one gear positioned between said master rotational member and said optical-element drive mechanism; and
another at least one gear positioned between said slave rotational member and said zooming-associated driven member.

7. The zoom lens camera according to claim 6, wherein said biasing member comprises a torsion coil spring positioned around an axis of a gear of said another at least one gear.

8. The zoom lens camera according to claim 1, further comprising a viewfinder optical system independent of said photographing optical system,
wherein said zooming-associated driven member comprises at least one movable optical element of said viewfinder optical system, said movable optical element being driven by said optical-element drive mechanism to vary a viewing angle of said viewfinder optical system in association with said zooming operation.

9. The zoom lens camera according to claim 1, wherein said optical element drive mechanism comprises:
a zoom gear which is rotatable about a rotational axis parallel to said common rotational axis of said three rotational members; and
a cam ring which is rotatable about a rotational axis parallel to said common rotational axis of said three rotational members,
wherein said cam ring comprises:
cam surfaces for moving said optical elements of said photographing optical system along said optical axis thereof in predetermined moving manners; and
a circumferential gear formed on a peripheral surface of said cam ring to be engaged with said zoom gear, and
wherein said master rotational member rotates in synchronization with said zoom gear.

10. The zoom lens camera according to claim 1, wherein said zoom lens camera comprises a retractable zoom lens barrel which is positioned around said photographing optical system, and retracted into a camera body upon a main switch of said zoom lens camera being turned OFF.

11. The zoom lens camera according to claim 9, further comprising a zoom motor and a reduction gear train for transferring a driving force of said zoom motor to said zoom gear.

12. The zoom lens camera according to claim 6, wherein said zooming associating mechanism comprises a cam plate positioned between said another at least one gear and said zooming-associated driven member to be linearly guided in a direction orthogonal to a direction parallel to said optical axis.

13. A rotation transfer mechanism for a photographing optical system including a rotational ring which is rotatable forwardly and reversely, and an associated driven member which is driven in association with a rotation of said rotational ring, said rotation transfer mechanism comprising:
at least three rotational members which are coaxially positioned on a common rotational axis to be rotatable thereon relative to one another, said common rotational axis extending parallel to a rotational axis of said rotational ring,
wherein said three rotational members include a master rotational member and a slave rotational member which are positioned at opposite ends of said three rotational members in a direction of said common rotational axis, respectively, said master rotational member being continuously associated with said rotation transfer mechanism to rotate whenever said rotation transfer mechanism operates, said slave rotational member driving said associated driven member by a rotation of said slave rotational member,
wherein opposed surfaces of any two adjacent rotational members of said three rotational members, which are adjacent to each other in said direction of said common rotational axis, each include a rotation transfer portion, said rotation transfer portions being engaged with each other at predetermined relative angular positions thereof in a rotational direction of said three rotational members so that said any two adjacent rotational members integrally rotate, said any two adjacent rotational members being allowed to rotate relative to each other at relative angular positions thereof other than said predetermined relative angular positions, and
wherein said slave rotational member rotates together with said master rotational member after relative rotations among all said any two adjacent rotational members occur in sequence when said photographing optical system changes from a retracted state to a ready-to-photograph state.

14. The rotation transfer mechanism according to claim 13, further comprising a biasing member for holding said slave rotational member at an angular position thereof at which said slave rotational member is held before being rotated together with said master rotational member.

15. The rotation transfer mechanism according to claim 13, wherein said master rotational member and said slave rotational member are identical to each other in shape and size, and symmetrically positioned with respect to a plane orthogonal to said common rotational axis.

16. A zoom lens camera having a retractable zoom lens which is retracted into a camera body upon a main switch of said zoom lens camera being turned OFF, wherein said zoom lens camera comprises:
a zoom lens drive mechanism for driving said retractable zoom lens along an optical axis to perform a zooming operation in a ready-to-photograph state of said retractable zoom lens, and for retracting said retractable zoom lens into said camera body to change said retractable zoom lens from said ready-to-photograph state to a retracted state upon said main switch being turned OFF; and a interconnection mechanism which interconnects said zoom lens drive mechanism with at least one zooming-associated driven member so that said zooming-associated driven member is driven by said zoom lens drive mechanism in association with said zooming operation in said ready-to-photograph state, said interconnection mechanism releasing an interconnection between said zoom lens drive mechanism and said zooming-associated driven member while said retractable zoom lens changes between said ready-to-photograph state and said retracted state, wherein said interconnection mechanism includes at least three rotational members which are coaxially positioned on a common rotational axis are rotatable thereon relative to one another, wherein said three rotational members include a master rotational member and a slave rotational member which are positioned at opposite ends of said three rotational members in a direction of said common rotational axis, respectively, said master rotational member being continuously associated with said zoom lens drive mechanism to rotate whenever said zoom lens drive mechanism operates, said slave rotational member driving said zooming-associated driven member by a rotation of said slave rotational member, wherein opposed surfaces of any two adjacent rotational members of said three rotational members which are adjacent to each other in said direction of said common rotational axis each include a rotation transfer projection, said rotation transfer portions being engaged with each other at predetermined relative angular positions thereof in a rotational direction of said three rotational members so that said any two adjacent rotational members rotate as one body, said any two adjacent rotational members being allowed to rotate relative to each other at relative angular positions thereof other than said predetermined relative angular positions, and wherein said slave rotational member rotates together with said master rotational member after relative rotations among all said any two adjacent rotational members occur in sequence when said retractable zoom lens changes from said retracted state to said ready-to-photograph state.

\* \* \* \* \*